Jan. 20, 1970  H. EHRENS ET AL  3,490,473
FLARE OPERATED VALVE
Filed Nov. 22, 1966  2 Sheets-Sheet 1
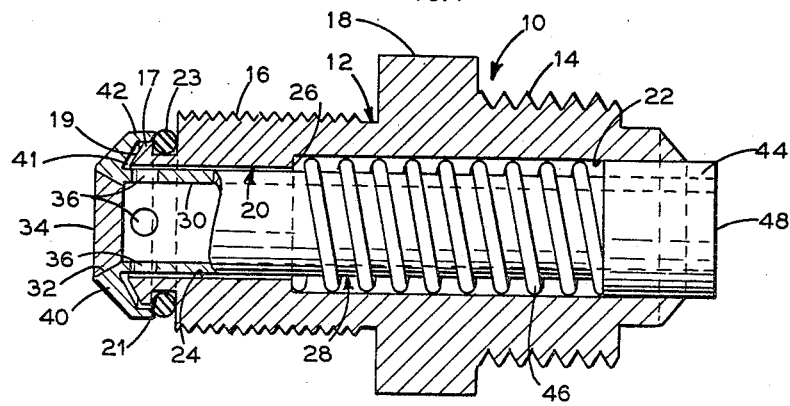
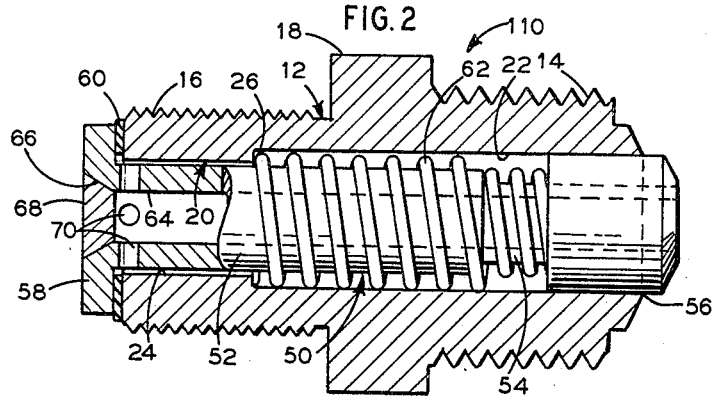
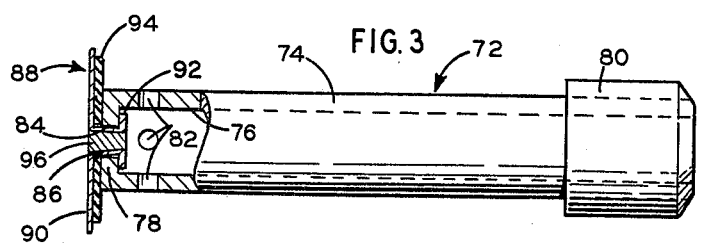
INVENTORS
Henry Ehrens
Sidney Weiner
BY
Yuter & Spiecens
ATTORNEYS

United States Patent Office 3,490,473
Patented Jan. 20, 1970

3,490,473
FLARE OPERATED VALVE
Henry Ehrens, Bayside, N.Y., and Sidney Weiner, Cresskill, N.J., assignors to Sealed Unit Parts Co., Inc., Allenwood, N.J., a corporation of New York
Filed Nov. 22, 1966, Ser. No. 596,331
Int. Cl. F16k 17/40; F16l 29/00
U.S. Cl. 137—74                                    7 Claims

ABSTRACT OF THE DISCLOSURE

A flare operated valve including a valve body which slidably receives a valve member in a through bore for movement between valve open and valve closed positions. A passage is provided in a valve member which normally is in communication with the through bore. The passage extends to one end of the valve member and sealing means is on the other end of the valve member which is engageable with the valve body to seal the through bore when the valve member is in the valve closed position. Said one end of the valve member extends beyond the valve body so that the valve member may be depressed to the valve open position. Biasing means is provided for biasing the valve member to the valve closed position. A fusible plug closes said other end of the passage in the valve member.

---

This invention relates generally to a valve construction and, more particularly, pertains to improvements in a flare operated valve.

An object of the invention is to provide a valve having a minimum of component parts offering a rugged construction.

Another object of the invention is to provide a valve construction having a long trouble-free operating life.

A further object is to provide a valve construction which is arranged so that a fluid will flow freely through the valve when it is in the open position at a relatively fast rate of flow.

Still another object is to provide a valve construction which includes safety means which provides a path for the escape of a contained fluid through the valve when the temperature of the fluid reaches a dangerous level.

In furtherance of the above objects, one embodiment of a valve constructed according to the present invention includes a valve body having a through bore which slidably receives a valve member for movement between a valve open and a valve closed position. Provided in the valve member is a passage which extends to at least one end of the member and which communicates with the through bore. Sealing means is provided at the other end of the valve member which is engageable with the valve body to seal the through bore when the valve is in the valve closed position. Said one end of the valve member extends beyond the valve body so that the same may be engaged by a flare nut.

The valve member is adapted to be depressed by a flare nut to unseat the same and to provide a path between the exterior of the valve body and the valve member passage, thereby allowing a fluid to flow through the valve. When the flare nut is removed, the valve member returns to its sealing relationship with the valve body to prevent the flow of a fluid through the valve.

In accordance with another feature of this invention, a fusible plug may be provided to seal the end of the passage in the valve member. The plug is selected so that it will melt when the temperature of fluid adjacent to the plug, such as the fluid confined within a tank, rises above a preselected dangerous temperature thereby to provide a passage for the flow of the fluid from the tank through the valve to the atmosphere. Thus, the pressure exerted by the gas on the tank automatically is reduced to eliminate the possibility of the tank exploding.

A feature of the invention resides in the provision of a relatively simple valve construction which is inexpensive to produce and which is positive in operation.

Other features and advantages of the present invention will become apparent from a consideration of the following detailed description when taken in conjunction with the accompanying drawings, in which:

FIG. 1 is a partial vertical sectional view of a flare operated valve constructed according to the present invention;

FIG. 2 is a partial vertical sectional view of a modified embodiment of a flare operated valve construction;

FIG. 3 is a front elevation view of a valve member, partially in section, which may be utilized with the valve body shown in FIG. 2;

Figure 4:
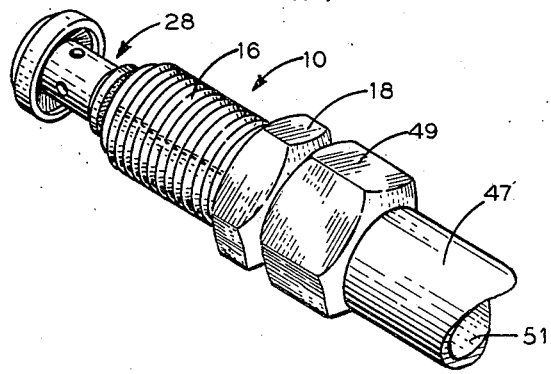
FIG. 4 is a perspective view of the valve shown in FIG. 1 with a flare nut attached thereto to operate the valve to the valve open position.

Referring to the drawings, there is shown in FIG. 1 a valve constructed in accordance with the present invention which is designated generally by the reference numeral 10. The valve 10 includes a valve body 12 fabricated from a suitable rigid material, such as metal or the like. The valve body 12 includes an enlarged diameter threaded portion 14, a reduced diameter threaded portion 16, and a radially extending flange 18 intermediate portions 14 and 16. The portion 16 is adapted to be threadedly engaged in the wall of a tank or the like (not shown) so that the bottommost portion of the valve body extends into the tank and the flange 18 abust the outer wall of the tank in sealing engagement therewith. A suitable gasket may be provided between the flange 18 and the wall of the tank to insure such sealing engagement. The valve 10 provides a selectively operable device which regulates the flow of a fluid either into or out of the tank.

For ease of reference, the left-hand portion of the valve 10, as taken in FIG. 1, will be referred to as the rear end and the right-hand portion of the valve will be referred to as the forward end. In accordance with this notation, a further reduced diameter portion 17 extends rearwardly from the threaded portion 16 and terminates in an outwardly forwardly inclined annular rear edge 19. Defined between the portion 16 and the portion 17 is an annular groove 21 which receives an O-ring 23 or washer therein which may be fabricated from a suitable resilient material such as rubber or the like. The function of the O-ring 23 will become apparent from a consideration of the discussion hereinbelow.

A central through bore 20, having a forward enlarged diameter portion 22 and a reduced diameter end portion 24 is provided in the valve body 12. The annular shoulder 26 is defined between the bore portions 22 and 24.

Slidingly received in the through bore 20 for reciprocating movement between a valve open and a valve closed position is a piston-like valve member designated generally by the reference numeral 28. The length of the valve member 28 is in excess of the length of the valve body 12 so that the ends of the valve member extend beyond the respective ends of the valve body 12. Provided in the valve member 28 is a central through passage 30 which terminates in an outwardly rearwardly inclined surface 32. A fusible plug 34, fabricated from a metal having a low melting point such as lead or a compound thereof, or the like, is in sealing engagement with the surface 32 to define the end wall of the passage 30. The plug 34 is adapted to melt when the temperature of the ambient fluid reaches a preselected level to open the end of the passage 30 thereby to provide a path for the flow of the fluid in the tank through the passage to the atmosphere. Thus, the valve 10 incorporates safety means which eliminates the possibility of the tank exploding in response to increased fluid pressure due to a rise in the temperature of the fluid.

A plurality of circumferentially spaced transverse bores 36 are provided in the valve member 28 adjacent the plug 34 which communicate with the passage 30 to provide respective exits for a fluid flowing through the passage 30. Provided at the rear end of the member 28 is an outwardly extending circular wall 40 which is spaced from and parallel to the rear edge 19 of the valve body 12 to define a passage 41 therebetween. The wall 40 extends beyond the rear edge 19 and is provided with a forwardly extending peripheral flange 42 which abuts the O-ring 23 to seal the passage 41 between the valve member 28 and the valve body 12.

The valve member 28 further includes a bushing 44 which is received on the forward end thereof by a press fit or the like, and which is in sliding and sealing engagement with the walls defining the bore 20 of the valve body 12. The forward edges of the bushing and the member 28 are coplanar. A biasing spring 46 is received about the valve member 28. One end of the spring 46 abuts the shoulder 26 and the other end of the spring abuts the rear edge of the bushing 44. The spring 46 is operable to bias the valve member 28 forwardly so that the flange 42 engages the O-ring 23 to close the valve 10 by sealing the passage 41 so that no fluid can flow therethrough.

In operation, it is assumed that the valve 10 of the present invention is used to regulate the flow of a fluid or gas from a tank or receiver or into the same.

Accordingly, as noted herein above, the portion 16 of the valve body 12 is threaded into an appropriately threaded bore in the wall of the tank (not shown). The thread can either be of the tapered self sealing type (pipe thread) or a straight machine thread where flange 18 would sealingly engage the wall of the tank with smooth machined surfaces or have an appropriate gasket between the surfaces of flange 18 and of the tank. Or the tank can have edges that would be rolled underneath flange 18 for sealing the valve body 12 to the tank.

It is further assumed that it is desired to remove pressurized fluid or gas from the tank. Accordingly the valve 10 is in a closed position with flange 42 in contact with O-ring 23. And accordingly, the flare nut 49 (FIG. 4) is threaded onto the portion 14 of the valve body 12 so that the passage 30 communicates with the aligned passage 51 of tube 47 (metal or plastic), that has a suitable flare inside the flare nut 49.

As the flare nut 49 is threaded onto the portion 14 of the valve body 12, the inner surface of the flared tube 47 engages the edge of the bushing 44 and upon reaching the next to the last thread, moves the bushing and concomitantly the valve member 28 rearwardly to unseat the flange 42. This action opens and enlarges the passage 41 to permit the fluid or gas to flow from the tank, through holes 36 into passage 30 through the tube 47 into a suitable tank, pressure gauge, etc.

In practice, the bores 36 are so located with respect to the rear edge 19 of the valve body 12 so that when the bushing 44 is completely depressed by the flare nut, the bores 36 will extend beyond the rear edge 19 of the valve body, as shown in FIG. 4. Accordingly, the flow of the fluid through the valve 10 will be uninhibited. That is, the fluid will flow through the passage 30 and the bores 36 directly into the tank. When the flare nut is removed, the spring 46 biases the valve member 28 back to the original position shown in FIG. 1 in which the peripheral flange 42 engages the O-ring 23 thereby to close the valve and to seal the interior of the tank from communication with the atmosphere.

It should be noted that the arrangement of flange 42 and O-ring 23 is two-staged in that the O-ring seals solely on low pressure and that the faces of portion 17 and edge 19 are engaged at high pressure, preventing the edge of flange 42 from cutting deep into the O-ring.

Accordingly, a flare operated valve has been described which is characterized by a rugged construction and trouble-free operation and which provides for the uninhibited flow of a fluid therethrough.

As the temperature of the fluid within the tank increases, the pressure of the fluid increases. If this condition is allowed to continue the pressure may reach a point which causes the tank to explode thereby possibly injuring both personnel and property in the vicinity of the tank. However, as a feature of the present invention, the valve 10 operates as a device to reduce the pressure within the tank when the temperature of the fluid within the tank reaches a predetermined dangerous level. More particularly, when the temperature of the fluid within the tank rises above a preselected dangerous level, the fusible plug 34 melts thereby to open the end of the passage 30. Thus, the gas may escape through the passage 30 to the atmosphere thereby to reduce the pressure within the tank and to eliminate the possibility of the tank exploding.

FIG. 2 illustrates a modified embodiment of a valve, designated generally by the reference numeral 110, which is constructed in accordance with the present invention. Portions of the valve 110 are similar to the valve 10; accordingly, the same reference numerals in the various figures indicate identical elements.

The valve 110 similarly includes a valve body 12. Received within the bore 20 in the valve 12 for reciprocating motion with respect thereto is a valve member designated generally by the reference numeral 50. The valve member 50 includes an enlarged diameter end portion 52 and a reduced diameter forward portion 54. Received on the forward end of the portion 54 of the valve member 50 and extending beyond the forward end of the valve body 12 is a bushing 56. The bushing 56 is in tight sliding engagement with the walls defining the bore portion 22.

The valve member 50 terminates in a radially extending flange 58 the forward surface of which mounts a resilient washer 60 which is adapted to be compressed between the rear edge of the portion 16 of the valve body 12 and the forward surface of the flange 58 to seal the passage therebetween when the valve is in the valve closed position. Moreover, a spring 62 biases the valve member 50 to the valve closed position. More specifically, the spring 62 includes a large diameter section which surrounds the enlarged diameter portion 52 of the valve member 50, and a reduced diameter portion which surrounds the reduced diameter portion 54 of the valve member. One end of the spring 62 abuts the rear edge of the bushing 56 and the other end of the spring seats on the shoulder 26 thereby to bias the valve member 50 to the aforementioned valve-closed position.

Provided in the valve member 50 is a central through bore 64 which terminates in a rearwardly outwardly inclined wall 66. Closing the end of the through bore 64 and in engagement with the wall 66 is a fusible plug 68 which is similar in construction to the fusible plug 34. A plurality of circumferentially spaced transverse bores 70 are provided in the valve member 50 adjacent to the fusible plug 68. The bores 70 communicate with the passage 64 to provide an outlet for fluid which flows through the passage 64.

The operation of the valve 110 is similar to the operation of the valve 10. More specifically, when a flare nut is threaded onto the portion 14 of the valve body 12, the nut engages that portion of the bushing 56 which projects beyond the front end of the valve body 12 to depress the valve member 50 and unseat the washer 60 from the rear end wall of the valve body 12. The bores 70 are positioned so that they extend beyond the rear end wall of the valve body 12 when the member 50 is depressed so that a fluid which may enter the passage 64 from a source of fluid will flow through the passage 64 and the bores 70 into the tank in which the valve 110 is located. When the flare nut is removed, the spring 62 biases the valve member 50 to the closed position whereby the washer 60 again is compressed between the rear end wall of the portion 16 of the valve body 12 and the forward surface of the flange 58 thereby to prevent communication between the passage 64 and the interior of the tank. Additionally, the fusible plug 68 provides a safety device if the temperature of the fluid rises above a preselected level similarly to the plug 34 in the valve of FIG. 1.

FIG. 3 illustrates another construction of a valve member 72 which may be utilized in conjunction with a valve body such as the valve body 12 to provide another embodiment of a flare operated valve. More particularly, the valve member 72 includes an elongated piston 74 having a bore 76 therein which is open at the front end and which terminates in an end wall 78 at the other end. The front end of the piston 74 mounts a bushing 80 as by a press fit or the like. A plurality of circumferentially spaced transeverse bores 82 are provided in the piston 74 adjacent the end wall 78 to provide an exit for fluid traversing the bore or passage 76.

Provided in the end wall 78 is an aperture 84. Received in the aperture 84 is the stem 86 of an eyelet designated generally by the reference number 88. The eyelet 88 comprises an enlarged radially extending flange 90 connected to one end of the stem 86 and a smaller, radially extending flange 92 connected to the other end of the stem 86 and received within the passage or bore 76.

A resilient member 94 is vulcanized or otherwise attached to the forward surface of the flange 90 and extends along the stem 86 of the eyelet 88. The resilient member 94 is compressed between the stem 86 and the walls defining the aperture 84 and between the rear surface of the wall 78 and the forward surface of the flange 90 to provide a seal to prevent the escape of fluid through the aperture 84. Additionally, a fusible plug 96, similar in construction to the plug 34, is received through the eyelet 88 to provide a passage for the flow of fluid from the tank when the temperature of the fluid rises above the predetermined dangerous level, in a manner similar to the operation of the fusible plug 34.

As shown in FIG. 3, the resilient member 94 extends along the flange 90 and beyond the end of the wall 78. The valve member 72 is adapted to be received within a valve body such as the valve body 12 of FIG. 2 so that the resilient member 94 is compressed between the flange 90 and the end of the valve body 12 thereby to seal the passage therebetween to prevent leakage of any fluid when the valve is in the valve closed position. The valve member 72 is adapted to be depressed in a manner similar to the valve member 28 to move the valve to the valve open position. Additionally, it is to be understood that a spring is provided in the valve body to bias the valve member to the valve closed position.

The valve member of FIG. 3 easily may be assembled by vulcanizing the resilient member 94 to the eyelet flange 90 and then inserting the stem of the eyelet through the aperture 84 and swaging over the stem 86 to form the flange 92 to hold the eyelet in place. Hence, the valve member 72 may be fabricated in a relatively easy and economical manner.

Figure 5:
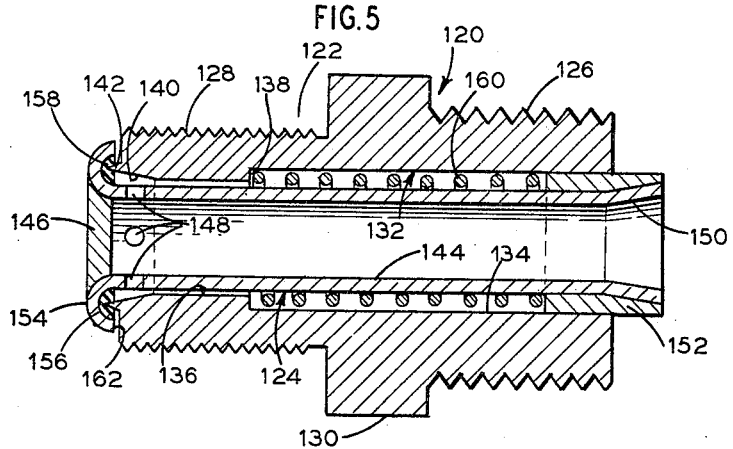
FIG. 5 is a vertical sectional view of another modified embodiment of a flare operated valve.
Figure 6:
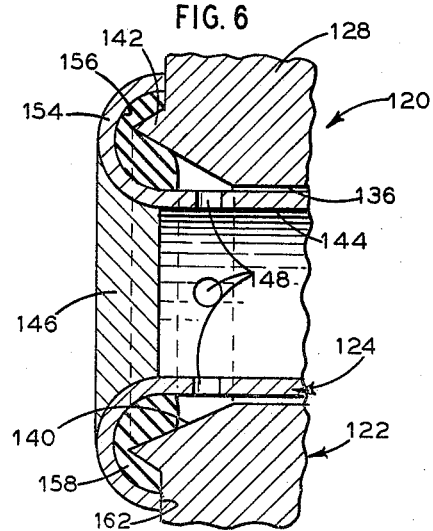
FIG. 6 is a sectional detailed view, to an enlarged scale, of the valve seat shown in FIG. 5.

FIGS. 5 and 6 illustrate a further modified embodiment of a flare operated valve which is designated generally by the reference numeral 120. Similarly to the embodiments shown in FIGS. 1 and 2, the valve 120 includes a valve body 122 and a valve member 124. The valve body 122 includes enlarged and reduced diameter threaded portions 126 and 128, respectively, which are separated by a radially extending flange 130.

A central through bore, designated generally by the numeral 132, is defined in the body 122 and comprises an enlarged diameter forward portion 134 and a reduced diameter rear portion 136 which define an annular shoulder 138 at their junction. The rear end of the bore portion 136 is inclined outwardly rearwardly at 140 for purposes which will become apparent from the description hereinbelow. Moreover, the portion 140 terminates in a rearwardly extending tapered annular rim 142 which extends beyond the rear edge of the reduced diameter portion 128 of the valve body 122.

The valve member 124 is slidingly received in the bore 132 for reciprocating movement between a valve open and a valve closed position. A central through passage 144 is provided in the valve member 124 and the rear end thereof sealingly receives a fusible plug 146 for the same reasons noted above in conjunction with the valve members 28 and 50. A plurality of circumferentially spaced transverse bores 148 are provided in the member 124 adjacent the plug 146 and communicate with the bore portion 136 and the passage 144. Accordingly, a fluid entering the passage 144 will traverse the passage and flow through the bores 148 into the bore portion 136 of the central bore 132.

The forward end of the member 124 extend beyond the body 122 and it is inclined outwardly forwardly at 150 and fixedly receives a bushing 152 thereon. The bushing 152 is in sliding and sealing engagement with the walk defining the bore 132 to prevent the flow of a fluid therebetween. In other words, the fluid which flows through the bores 148 into the bore portion 136 of the bore 132 is prevented from flowing out the forward end of the bore 132 by the sealing engagement of the bushing 152 with the walls defining the bore 132.

The rear end of the member 124 is peened over at 154 to form an annular recess 156. Received within the recess 156 and vulcanized to the member 124 is an annular resilient member 158 which is adapted to seat on the rim 142 when the valve member 124 is in the valve closed position. In other words, as shown in FIGS. 5 and 6, the projecting rim 142 extends into the resilient member 158, which may be fabricated from neoprene or the like, thereby to close the bore portion 136 of the bore 132. Alternatively, the annular resilient member 158 can be an O-ring. In such a case the peening is further carried over the O-ring to lock the latter in place.

A biasing spring 160 surrounds the member 124 with one end of the spring abutting the shoulder 138 and the other end of the spring abutting the bushing 152 to bias the valve member to the valve closed position. Thus, the valve 120 will remain in the valve closed position until moved to the valve open position by a flare nut, in the manner indicated above.

In practice, the member 124 is preferably formed from a conventional eyelet. The peened over portion 154 represents one end of the eyelet portion of the member 124 which extends through the bore 132 and corresponds to the stem of the eyelet. The other end of the eyelet is sheared off so that the stem portion easily may be inserted into the bore 132 when the valve is assembled. The tapered wall 140 is provided so that the bore 132 does not engage the eyelet (member 124) at the portion which is rolled or peened over.

In operation, and assuming that the valve 120 is received through the wall of a tank in the manner noted above in conjunction with the valve 10, the valve member 124 will normally reside in the valve closed position. If the pressure of the fluid within the tank is relatively low, the rim 142 will project into the resilient member 158 to seal the bore 132, as noted above. In order to ensure a tight seal, the forward surface of the member 158 is formed so that it is relatively flat.

If, on the other hand, the pressure of the fluid in the tank is relatively high, the fluid will exert a forwardly directed force on the member 124 thereby to move the member 124 forwardly until the flat forward edge 162 of the peened over portion 154 engages the end wall of the body 122. Thus, the engagement of the edge 162 with the valve body 122 limits further forward movement of the valve member 124 and it also provides a further high pressure seal to prevent communication between the interior of the tank and the bore 132.

When it is desired to fill the tank with a desired fluid, a flare nut is threaded onto the body portion 126 similarly to the operation of the valve 10. This action moves the member 124 rearwardly to unseat the same so that the fluid flows through the passage 144 and the bores 148 and into the tank.

Additionally, if the temperature of the fluid in the tank reaches a dangerously high level, the fusible plug 146 melts to open the end of the passage 144 to provide a path for the escape of the fluid.

What is claimed is:

1. A flare operated valve for controlling the flow of a fluid therethrough comprising a valve body having a through bore, said valve body including an outer threaded portion adapted to be threadedly engaged by a flare nut, a valve member received in said through bore for reciprocating movement between a valve open and a valve closed position, an axial passage extending through said valve member, a plurality of circumferentially spaced transverse bores extending through said valve member into communication with said axial passage and being located adjacent one end of said valve member, a plug closing said axial passage at said one end of said valve member, said valve member being sized to extend beyond the ends of said valve body, an outwardly extending flange at said one end of said valve member, sealing means comprising a resilient member adapted to be compressed between said flange and said valve body when said valve member is in the valve closed position to seal said through bore, the other end of said valve member being adapted to be engaged by the flare nut received on said threaded portion whereby said valve member is depressed to the valve open position when said flare nut is fully threaded on said threaded portion, said plurality of transverse bores being geometrically positioned such that said bores are received within said through bore when said valve member is in the valve closed position and said transverse bores are spaced beyond said valve body when said flare nut is fully threaded thereon, and spring means for biasing said valve member to the valve closed position.

2. A valve as in claim 1, said valve member including a bushing received on the other end thereof and extending beyond the end of said valve body, said bushing being sized to engage said through bore in tight sliding engagement therewith.

3. A valve as in claim 1, in which said plug is a fusible plug, whereby said fusible plug is adapted to open said passage when the ambient fluid reaches a predetermined temperature to provide a path for the flow of the fluid through said passage.

4. A valve as in claim 1, in which said passage terminates in an end wall having an aperture therein, and an eyelet received in said aperture and including a radially extending flange, said sealing means being connected with said radially extending flange and being adapted to be compressed between said valve member and said valve body to seal said through bore.

5. A valve for controlling the flow of a fluid therethrough as in claim 1, and a reduced diameter portion extending longitudinally from the rear end of said valve body and defining a groove, said resilient member comprising an O-ring received in said groove, said flange including a forwardly extending portion adapted to engage said O-ring to seal said through bore.

6. A valve as defined in claim 1,
    in which said valve body is provided with a rearwardly extending tapered annular rim;
    said sealing means including a recess in said valve member,
    a resilient member in said recess adapted to engage said rim when said valve member is in said valve closed position to seal said through bore.

7. A valve in accordance with claim 6, in which said sealing means further includes a flat annular edge on said valve member adjacent said recess adapted to sealingly engage the said body in response to relatively high pressures applied to said valve members.

References Cited

UNITED STATES PATENTS

| 769,688 | 9/1904 | Cedarstrom | 251—149.6 |
| 927,983 | 7/1909 | Landau | 251—149.7 XR |
| 1,756,133 | 4/1930 | Parker | 137—74 XR |
| 1,958,786 | 5/1934 | Eastman | 251—149.7 |
| 2,650,793 | 9/1953 | Clark et al. | |
| 2,666,448 | 1/1954 | Garretson et al. | 137—74 XR |
| 2,842,382 | 7/1958 | Franck | 251—149.4 |
| 2,200,124 | 5/1940 | Sands | 137—73 |

ROBERT G. NILSON, Primary Examiner

U.S. Cl. X.R.

251—149.4